United States Patent [19]

Grassmuck et al.

[11] Patent Number: 4,854,751
[45] Date of Patent: Aug. 8, 1989

[54] ANTIFRICTION BEARING

[75] Inventors: Volker Grassmuck; Benno Jörg, both of Weinheim; Eberhard Sommer, Weinheim-Laudenbach, all of Fed. Rep. of Germany

[73] Assignee: Firma Carl Freudenberg, Weinheim/Bergstr., Fed. Rep. of Germany

[21] Appl. No.: 192,367

[22] Filed: May 10, 1988

[30] Foreign Application Priority Data

Jul. 25, 1987 [DE] Fed. Rep. of Germany ....... 3724752

[51] Int. Cl.$^4$ .................... F16C 43/00; F16C 33/76
[52] U.S. Cl. .................... 384/537; 384/476; 384/477; 384/536; 384/903
[58] Field of Search ............ 384/445, 476, 477, 481, 384/482, 490, 510, 535–539, 559, 561, 570, 903

[56] References Cited

U.S. PATENT DOCUMENTS

| 2,536,819 | 1/1951 | Lyman | 384/539 |
| 2,647,808 | 8/1953 | Spurgeon | 384/477 |
| 2,665,954 | 1/1954 | Sherrill | 384/903 X |
| 2,986,432 | 5/1961 | Schlauch | 384/536 |

FOREIGN PATENT DOCUMENTS 1779772  8/1958  Fed. Rep. of Germany .

*Primary Examiner*—Thomas R. Hannon
*Attorney, Agent, or Firm*—Felfe & Lynch

[57] ABSTRACT

An antifriction bearing, in which the outer ring is supported in the bore of a rotating machine part and secured by a retaining ring against axial displacement. The retaining ring is snapped into a circumferential groove of the bore and is supported, freely movable towards the outside in the radial direction, in the axial direction on the side of a conical surface facing away from the inner ring. By this structure, the axial contact pressure of a gasket of a polymeric material, which is disposed between the retaining ring and the radial antifriction bearing, and which bridges the gap between the outer ring and the inner ring of the antifriction bearing, increases as the rotational speed increases.

3 Claims, 1 Drawing Sheet

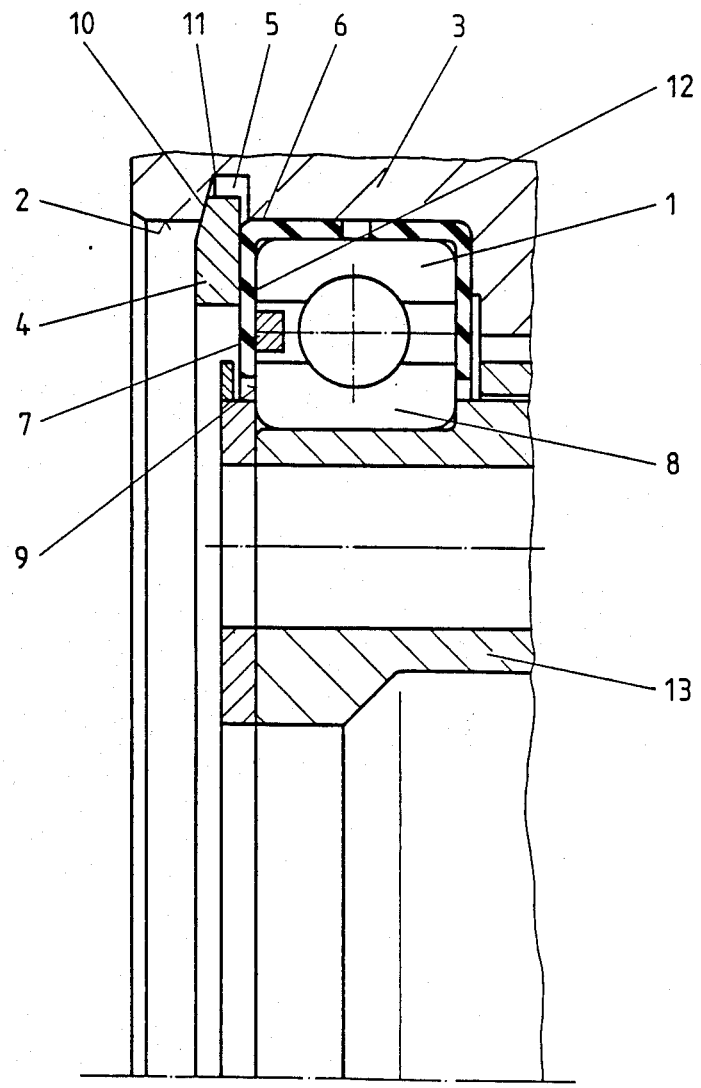

ANTIFRICTION BEARING

The invention relates to an antifriction bearing.

An antifriction bearing is known from the German Utility Patent No. 1,779,772. The retaining ring used in this bearing has a circular profile and is snapped into a groove of the fitting profile of the outer ring. The resulting axial displacement of the retaining ring in the groove can be greater or less depending on the dimensional accuracy of the mutually touching surfaces. This is not very satisfactory and can have a disadvantageous effect on the guidance of the outer ring. The gap between this and the inner ring is, moreover, closed off by gaskets. Independent means are provided for pressing the gaskets against the side surfaces. A special expense is associated with this, which is not very satisfactory from the point of view of costs. The independent means of pressing the gaskets against the side surfaces also require much space, which frequently is not available.

It is an object of the present invention, therefore, to provide a new and improved antifriction bearing which avoids one or more of the disadvantages and limitations of prior such bearings.

It is another object of the invention to develop further an antifriction bearing of the above-described type in such a manner, that a construction results, which is simplified and space saving, yet provides precise guidance for the outer ring and, at the same time, ensures that the gasket is pressed firmly at least against the side surface of the outer ring.

For the antifriction bearing of the invention, the width of the retaining ring is less than that of the groove. In the installed state, the retaining ring on the one hand is supported on the side of the groove facing away from the side surface of the outer ring on at least one conical surface and, on the other, is at a radial distance from the bottom of the groove. By these means, the gasket, disposed between retaining ring and the outer ring, is pressed, independently of any dimensional deviations that may be present, firmly against its side faces. Aside from an excellent seal, this ensures in this area a rigid fixation of the outer ring of the antifriction bearing on the base of the accommodating housing bore. This is in no way endangered by the introduction of oscillations or high rotational speeds. It is therefore readily possible to use the antifriction bearing of the invention in the field of mechanical engineering or motor vehicle technology.

The conical annular surface, supporting the retaining ring in the axial direction, may be a component of the groove, of a conical annulus or of both. The production in the first-mentioned cases is particularly simple, while in the last-mentioned case the advantage results that a particularly low, specific surface pressure arises in the area of the mutually contacting conical surfaces. This is of great importance for the long-lasting radial mobility of the retaining ring in the accommodating groove. Wear in the area of the mutually contacting conical surfaces need not be feared, especially when these surfaces have an identical conical angle, for example, one between 60° and 80°. Sharp edges and corners should not be present in the region of the areas of the retaining ring and the groove that slide over one another and moreover also not in the region of the radial splitting of retaining ring.

This splitting is present in order to endow the retaining ring with the necessary radial mobility.

The retaining ring may have a supporting surface which faces the side surface of the outer ring, is constructed flat and extends in the radial direction. The specific surface pressure of the gasket of polymeric material disposed between the retaining ring and the outer ring of the antifriction bearing is clearly reduced by these means. This reduces the magnitude of the deformation due to the contacting pressure and it simplifies the problem of achieving a constant assignment of the gasket to the gap that is to be sealed between the outer ring and the inner ring. It is also readily possible to extend the supporting surface of the retaining ring in the radial direction inwards in such a manner, that the gap between the outer ring and the inner ring of the antifriction bearing is partly bridged. Any unwanted evasive movement of the gasket in the axial direction towards the outside is thereby precluded.

In accordance with the invention, an antifriction bearing comprises an inner ring supported in a first bore of a rotating machine part and an outer ring supported in a second bore of a rotating machine part. The second bore has a circumferential groove serving the outer ring. The bearing comprises a retaining ring against axial displacement, the retaining ring being snapped into the circumferential groove of the second bore. The bearing also includes a gasket of a polymeric material, which bridges a gap between the outer ring and the inner ring and lies under elastic pretension against a side surface of the inner ring, being disposed between the retaining ring and a side surface of the outer ring. The retaining ring in the installed state on the one hand is supported on a side of the groove facing away from a side surface of the outer ring on at least one conical surface and, on the other, is at a radial distance from the bottom of the groove.

For a better understanding of the invention, together with other and further objects thereof, reference is made to the following description, taken in connection with the accompanying drawing, and its scope will be pointed out in the appended claims.

Referring now to the drawing, the drawing partially shows in semisectional representation, partly diagrammatic, an arrangement, in which two machine parts, which rotate about a common axis, are supported one on top of the other by an antifriction bearing so that they can rotate relative to each other.

The antifriction bearing there represented is constructed as a ball bearing and comprises the outer ring 1 and the inner ring 8. The outer ring 1 is thermally insulated from the outer member 3 of the two machine parts by two covering caps 6 of a polymeric material, which are open towards one another. Each of the covering caps has an angular profile, the two legs of which overlap the outer ring 1 on the one hand on the surface pointing towards the outside in the radial direction and, on the other, in the region of the side surface.

Each of the last-mentioned legs preferably is extended so far inwardly in the radial direction, that the gap between the outer ring 1 and the inner ring 8 of the ball bearing is fully covered and there additionally preferably is mutual axial sealing contact between the leg and the axial side surface of the inner ring 8. The two covering caps preferably are constructed as mirror images. They preferably consist of a polyether ketone or of hard material, such as a phenolic resin or rubber with a high Shore hardness and enclose the outer ring 1 of the antifriction bearing in the region of its two side surfaces. Moreover, the right covering cap of the two lies with its axial outer side at the base of the accommodating bore 2 of the outer member 3 of the two machine parts connected by the ball bearing.

To the left of the outer ring 1, bore 2 additionally preferably has a circumferential groove 5, the periphery of which, which is averted from the outer ring 1, is formed by a conical surface 10. This engages in the manner shown a conical surface 10 of the retaining ring 4. This ring is so dimensioned and so coordinated with the profile and the disposition of the groove 5, that under normal operating conditions the radial leg of the covering cap 6 is pressed axially as shown against the side surface 12 of the outer ring 1 of the ball bearing. This is substantially due to the fact that the retaining ring 4 preferably is constructed from a spring steel and, as a result of the manufacturing process, has an outer diameter, which is identical with that of the accommodating groove 5. At one place on its periphery, the retaining ring 4 is provided with a radial severance, which is so dimensioned in the circumferential direction, that the diameter can be reduced to a size smaller than the diameter of the bore 2. By these means, the retaining ring can be introduced in the axial direction into the bore and, on reaching groove 5, attempts to regain its original size. It can do so only conditionally due to the mutual contact between its conical surface and the conical surface 10 of the groove.

By these means, a latent, axial bracing results between the retaining ring 4, the leg of the covering cap 6 and the outer ring 1 of the antifriction bearing, as a consequence of which the covering cap 6 is not only pressed firmly against the outer ring 1 of the antifriction bearing, but, at the same time, the outer ring 1 is pressed against the opposite, inwardly pointing leg of the covering cap disposed there, which lies directly against the bottom of the accommodating bore 2. Independently of any deviations that may be present in the dimensions of any part, this arrangement results in a rigid fixation of the cup 1 of the antifriction bearing at a particular axial position. This is imperiled neither by the introduction of oscillations nor by the introduction of the highest rotational speeds. On the contrary, the latter support the outwardly directed spring motion of the retaining ring 4 and, with that, the achievement of a fixed axial clamping of the outer ring 1 of the antifriction bearing.

The side surface 12 of the retaining ring extends toward the centrifugal weights 7 which are fastened to the radial leg of the covering cap 6 and extends axially beyond the radial level of the side surface 12. This favors the process of pressing the covering cap also against the assigned side surface 9 of the inner ring 8 of the antifriction bearing and a good sealing effect is thus also achieved in this region.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An antifriction bearing comprising:
   an inner ring supported in a first bore of a rotating machine part;
   an outer ring supported in a second bore of a rotating machine part, said second bore having a circumferential groove serving said outer ring;
   a retaining ring against axial displacement, said retaining ring being snapped into said circumferential groove of said second bore; and
   a gasket of a polymeric material, which bridges a gap between said outer ring and said inner ring and lies under elastic pretension against a side surface of said inner ring, being disposed between said retaining ring and a side surface of said outer ring;
   said retaining ring in the installed state on the one hand being supported on a side of said groove facing away from a side surface of said outer ring on at least one conical surface and, on the other, being at a radial distance from the bottom of said groove;
   said retaining ring having a supporting surface, which faces a side surface of the outer ring, being constructed flat and extending in a radial direction;
   said supporting surface extending inwardly in a radial direction and bridging at least partially said gap between the said outer ring and said inner ring.

2. The antifriction bearing of claim 1, wherein said conical surface is constructed as a periphery of said groove.

3. The antifriction bearing of claim 1, wherein said conical surface is constructed as a periphery of said retaining ring.

* * * * *